(12) United States Patent
Leberer

(10) Patent No.: US 7,755,744 B1
(45) Date of Patent: Jul. 13, 2010

(54) ENVIRONMENT SENSOR THAT CONVEYS INFORMATION ABOUT OBJECTS IN THE VICINITY OF THE VISUALLY IMPAIRED USER

(76) Inventor: Thomas Leberer, August Bebel Strasse 47, D-04416 Markkleeberg (DE)

( * ) Notice: Subject to any disclaimer, the term of this patent is extended or adjusted under 35 U.S.C. 154(b) by 263 days.

(21) Appl. No.: 11/893,579

(22) Filed: Aug. 15, 2007

(51) Int. Cl.
*G01C 3/08* (2006.01)
*G09B 21/00* (2006.01)

(52) U.S. Cl. .................................. 356/5.1; 434/114
(58) Field of Classification Search ............... 356/4.01, 356/5.1; 367/116; 343/114
See application file for complete search history.

(56) References Cited

U.S. PATENT DOCUMENTS

| | | | |
|---|---|---|---|
| 3,337,839 A | 8/1967 | Nelkin | |
| 3,546,467 A | 12/1970 | Benjamin, Jr. | |
| 3,654,477 A | 4/1972 | Benjamin, Jr. | |
| 4,310,903 A | 1/1982 | Kay | |
| 4,712,003 A | 12/1987 | Ban et al. | |
| 4,737,108 A * | 4/1988 | Chepaitis | 434/113 |
| 5,687,136 A | 11/1997 | Borenstein | |
| 5,717,392 A | 2/1998 | Eldridge | |
| 5,807,111 A | 9/1998 | Schrader | |
| 5,973,618 A | 10/1999 | Ellis | |
| 6,159,013 A * | 12/2000 | Parienti | 434/114 |
| 6,198,395 B1 | 3/2001 | Sussman | |
| 6,298,010 B1 | 10/2001 | Ritz et al. | |
| 6,486,784 B1 | 11/2002 | Beckers | |
| 6,489,608 B1 * | 12/2002 | Skilling | 250/281 |
| 2009/0028003 A1 * | 1/2009 | Behm et al. | 367/116 |

FOREIGN PATENT DOCUMENTS

| | | |
|---|---|---|
| EP | 0669119 | 8/1995 |
| EP | 0749744 | 12/1996 |
| WO | WO 2005002490 A1 * | 1/2005 |

* cited by examiner

*Primary Examiner*—Isam Alsomiri
(74) *Attorney, Agent, or Firm*—Thomas I. Rozsa

(57) ABSTRACT

The present invention relates generally to the field of virtual tactile sensing, specifically to the field of virtual extension of the senses of the fingertips. Specifically, the present invention is the tactile transfer of environment information to the fingertips of the operator in the form of a line. The present invention senses information regarding distance, thermal values and optical spectrum values and conveys this information to the operator by means of mechanical movements and/or thermal changes of the actuators. These actuators are the equivalent of placing the operator's fingertips on the object. The device as a whole acts as an extension of the hand that senses information by placing virtual fingertips on an object and conveys that information to the operator's fingertips.

38 Claims, 6 Drawing Sheets

ENVIRONMENT SENSOR THAT CONVEYS INFORMATION ABOUT OBJECTS IN THE VICINITY OF THE VISUALLY IMPAIRED USER

BACKGROUND OF THE INVENTION

1. Field of the Invention

This invention relates generally to the field of devices to enable visually impaired people to determine information about objects in their vicinity.

2. Description of the Prior Art

In general, devices for capturing and measuring distances, temperatures, and optically spectral differences are known in the prior art. These devices are commonly in the form of 3D-sensors, rangefinders, cameras, and temperature sensors. Common methods and procedures used to make such measurements include measurement of the running time, photonic mix devices, stereopsis, and triangulation procedures. The representation of these data and the communication of these data is conventionally in a two-dimensional format, such as on a visual screen, a printout, 3D-plots or other two-dimensional representations, by acoustic signals, or by a combination of the two.

Such devices do not offer meaningful information to the blind. Those devices using a visual screen or a printout are of no use to the visually impaired and those devices that use an acoustic tone or signal give the exceedingly narrow information of a warning of the presence of a tangible object. However, a problem common to all these devices is that some tangible objects are very difficult to detect and yet still pose a hazard for the visually impaired. By way of example, most devices would tend to have trouble detecting a chain link fence up close or a glass wall at night.

Visually impaired persons need more than an alert that a tangible object has been detected; they need information about the object that has been sensed.

The following 12 patents and 2 European patents are relevant to the field of the present invention.

1. U.S. Pat. No. 3,337,839 issued to Arthur Nelkin and assigned to Westinghouse Electric Corporation on Aug. 22, 1967 for "Vetrasonic Guidance Apparatus" (hereafter the "Nelkin Patent");

2. U.S. Pat. No. 3,546,467 issued to Joel Malvern Benjamin, Jr. et al. on Dec. 8, 1970 for "Typhlocane With Range Extending Obstacle Sensing Devices" (hereafter the "'467 Benjamin Patent");

3. U.S. Pat. No. 3,654,477 issued to J. Malvern Benjamin, Jr. and assigned to Bionic Instruments, Inc. on Apr. 4, 1972 for "Obstacle Detection System For Use By Blind Comprising Plural Ranging Channels Mounted On Spectacle Frames" (hereafter the "'477 Benjamin Patent");

4. U.S. Pat. No. 4,310,903 issued to Leslie Kay on Jun. 12, 1982 for "Method Of And Apparatus For Providing Information As To The Existence Or Position Of Objects" (hereafter the "Kay Patent");

5. U.S. Pat. No. 4,712,003 issued to Itsuki Ban et al. on Dec. 8, 1987 for "Blind Person Guide Device" (hereafter the "Ban Patent");

6. U.S. Pat. No. 5,687,136 issued to Johann Borenstein and assigned to The Regents of the University of Michigan on Nov. 11, 1997 for "User-Driven Active Guidance System" (hereafter the "Borenstein Patent");

7. U.S. Pat. No. 5,717,392 issued to Marty Eldridge on Feb. 10, 1998 for "Position-Responsive, Hierarchically-Selectable Information Presentation System And Control Program" (hereafter the "Eldridge Patent");

8. U.S. Pat. No. 5,807,111 issued to Jens Schrader on Sep. 15, 1998 for "Orientation Aid" (hereafter the "Schrader Patent");

9. U.S. Pat. No. 5,973,618 issued to Christ G. Ellis on Oct. 26, 1999 for "Intelligent Walking Stick" (hereafter the "Ellis Patent");

10. U.S. Pat. No. 6,198,395 issued to Gary E. Sussman on Mar. 6, 2001 for "Sensor For Sight Impaired Individuals" (hereafter the "Sussman Patent");

11. U.S. Pat. No. 6,298,010 issued to Maria Ritz et al. on Oct. 2, 2001 for "Orientation Aid For The Blind And The Visually Disabled" (hereafter the "Ritz Patent");

12. U.S. Pat. No. 6,486,784 issued to Fabien Beckers on Nov. 26, 2002 for "Process And System Enabling The Blind Or Partially Sighted To Find Their Bearings And Their Way In An Unknown Environment" (hereafter the "Beckers Patent");

13. European Patent No. EP0669119 issued to Fischer UWE on Aug. 30, 1995 for "Guiding Device" (hereafter the "Fischer European Patent");

14. European Patent No. EP0749744 issued to Guenther Detlef on Dec. 27, 1996 for "Guiding Apparatus For The Blind" (hereafter the "Detlef European Patent").

The Nelkin Patent which issued in 1967 discloses the broad general concept of having a device which scans the area in front of the person and provides a tactile stimulation in different areas of the device so that the person after he is trained in what the tactile stimulations mean will be able to determine recognition of what the device in front of the person is.

Referring to the Nelkin Patent, the preferred embodiment of the ultrasonic guidance apparatus as shown in FIGS. 1 and 4 appears to show that the device is in the shape of a vest or a belt worn around the person. The display is strapped onto the body of the user both front and back. Additionally, the Nelkin apparatus is large and it appears that both the front piece and the back piece each cover an area that is nearly the entire width of a person's torso. The device is large, bulky and not easy to handle.

Another problem with the Nelkin Patent is the difference between its design and its practical use. The Nelkin apparatus is designed such that the indicator of the presence of an object is "an array of tactile-stimulus producers coupled to a skin area of the user's body." (Col. 1, lines 67-68) (emphasis added). However, in referring to FIG. 1, which is an accurate representation of how a user would wear the device, the apparatus, both the front piece and the back piece, are worn on the outside of the clothes. Therefore, the coat or other garments between the device and the individual block some of the signals and reduce the quality of the signals sensed by the user. However, this may be necessary to protect the user's body from pain and bruising, as the Nelkin apparatus makes a complete scan of all nine transducers eight times a second in short range mode, six times a second in medium range mode, and four times a second in long range mode, which potentially results in the Nelkin apparatus pummeling the wearer's back either seventy-two times a second in short range mode, fifty-four times a second in medium range mode, and thirty-six times a second for the long range mode.

The Nelkin Patent discloses the broad concept of scanning the area in front of the person to provide feedback signals as to what the scan detects. However, this device is limited to ultrasonic scanning. Further, the Nelkin apparatus is merely a blunt, obstacle recognition device. The Nelkin Patent claims that when scanning about seven feet from the operator, the 3×3 grid of "transducer beams cover roughly an outline of 4 feet high by 4 feet wide" (Col. 2, lines 65-66). This indicates that each transducer is sensing an area of 16 inches×16 inches. This means that if a transducer receives feedback of anything within the 256 square inch area that it is sensing, the tactile sensing device will be triggered. This means that the Nelkin device is incapable of distinguishing small or large objects or make finer sensing, like the outline of a cup, but instead, the operator will merely get a thump on the back that an object has been sensed, not knowing if the Nelkin Patent sensed a cup, a plant, or a television. With regard to larger objects, the Nelkin Patent is incapable of distinguishing between a door, a wall, a cave, a group of people, a hedge, a fence, or an elephant. Further, where there are lots of people, the Nelkin Patent will become useless and merely pummel the operator ceaselessly without conveying any pertinent or new information to the operator. The Nelkin Patent merely gives the operator an extremely large pixellated sense of the mere presence of an object and is not capable of allowing the operator to "see" what lies ahead by offering a sharper, finer image of what is sensed.

The '467 Benjamin Patent has a cane with a sensing device to pick up if there is an obstacle in the path of the cane and provide a signal from a signaling means that pokes the operator, which is shown as 306 in FIG. 4. The Benjamin Patent is a fairly involved sensing apparatus which senses an object in the path of the cane and provides a signaling means to the person holding the cane so that the operator is poked by the signaling means to advise the person that there is an object in the path of the cane.

The '467 Benjamin Patent sensors their corresponding means to notify the operator do not give the operator a picture or a sense of what is in front of the operator. In referring to the '467 Benjamin Patent, the preferred embodiment of the invention shown in FIG. 1, appears to show that the apparatus does not have a complete line of site, but instead, has a disjointed sensing means for sensing three small ranges, the views above, at thigh level, and at ground level of the operator. Like the Nelkin Patent, the '467 Benjamin Patent merely acknowledges the presence of an obstacle in any one of those three areas to the operator. It does not convey to the operator the different details about what the object is, but merely conveys that an object is near. Additionally, the '467 Benjamin Patent senses objects by receiving its reflection; each of the three projected beams "is approximately ½ degree. Thus at 10 feet the beam is about 2 inches long and ½ inch high." (Col. 6, lines 50-52). Therefore, the '467 Benjamin Patent only provides the operator with three very small windows of the world ahead. While the upper two sensors of the '467 Benjamin Patent detect the presence of an object, the bottom sensor is designed to detect the absence of an object. Further, '467 Benjamin Patent notifies the operator of the presence or absence of an object in a general manner. The means to notify the operator of an object sensed by the middle sensor is by means of "a tactile stimulator 305 [that] includes a poker 306, which projects through the casing of the shank." (Col. 11, lines 43-45). For the upper sensor which detects the presence of an object and the lower sensor which detects the absence of an object, the means to notify the operator is "by an audible tone" (Col. 11, line 54). The '467 Benjamin Patent is simply a cane with using laser scanners that give feedback, regarding presence or absence of obstacles in three very specific areas, in very general terms.

The '477 Benjamin Patent is an obstacle detecting device which, also, through the unique electronics of the device, indicates the presence of an obstacle in the operators's path. However, the device is merely a warning system. The primary focus of this invention is to incorporate the obstacle detecting and warning device onto an eyeglass frame, which when worn by the operator will poke the operator behind the ear when an obstacle is detected.

The inventor of this patent is the same individual as the Mr. Benjamin from the previous patent and, again, discloses the concept of scanning the area in front of the operator to pick up signals with the purpose of this invention is to warn the operator that there is an obstacle in front of the sensors without giving any details about the obstacle. This invention has many disadvantages. The invention utilizes Fresnel lenses which are used in applications where imaging quality is not critical. Further, this device detects obstacles by measurement of the laser run time, "the time between the transmission and reception of the pulse." (Abstract). The '477 Benjamin Patent has a very annoying means of alerting the operator to the detected presence of an obstacle. A small rod 44 protrudes from the ear piece 30 to poke the back of the ear to warn of an impending obstacle. Further, the hole 56 out of which the small rod 44 projects has a forward bearing 58 that extends slightly beyond the body of the earpiece 30. Since the ear piece must be very closely situated behind the ear so that the small rod can reach the back of the ear when actuated, the forward bearing 58 is most likely rubbing against the back of the operator's ear. If the rod 44 does not fully return to the interior of the hole 56, then the rod 44, will also be rubbing against the back of the operator's ear. Another disadvantage is that the power supply or battery for this device is not incorporated into the eyeglass frame, but instead resides in its own unit or canister 28, for which the operator must accommodate, either by wearing a jacket with a breast pocket or some other means, but having some sort of way to protect the operator from the heat from the power supply and yet allow the power supply to dissipate its heat. Further, the '477 Benjamin Patent is dangerous. As illustrated in FIG. 4, the optical system resides behind the lens of the eyeglass frame, such that all the lasers, photopickups, and etc., are entirely "accommodated in the space between the lens area and the wearer's eye." (Abstract). As shown in FIG. 4, after accommodating all the electronics, there is very little space between the device and the eye of the wearer. Should the wearer get bumped or fall or even be jostled, the back of the device would be in various degrees of contact with the eye of the wearer and cause damage and pain. Between the rubbing and the poking on the back of the ear, dealing with a loose battery pack that inevitably heats up, and the possible loss of the eyeball, the operator may find this device very uncomfortable to use and wear.

The Kay Patent also discloses the concept of having an ability to detect objects for the visually impaired by transmitting a stress wave which is reflected back to the device to provide the information to the person about an object in the person's path. Using sound waves in the supersonic frequency range, the Kay device modulates the frequency of the sound waves and determines the range from the object by the magnitude of the frequency difference in the received signal. The Kay Patent is focused on the method of determining distance and only in very general terms discusses how the object range could be communicated to the operator by sight, sound or touch. For tactile sensing, the Kay Patent teaches a matrix of rows and columns of pins that will vibrate to indicate a sector where an object has been located. There is no evidence that the Kay Patent is capable of being a handheld or portable device.

The Ban Patent discloses a device incorporated onto a cane, which using either infra-red or sonar, sends out a signal and receives a return signal to tell a blind person as to the distance the object is from the blind person. The Ban device is capable of measuring only one point at a time, merely warns the operator of the presence of an object, and does so by vibrating the cane.

The Borenstein Patent is a user driven activation guidance system. It is a large device on a pair of wheels and rolls in front of the operator who must push it from the long handle extending from the device to the operator. The device functions as an obstacle avoidance system. It uses an array of ultrasonic sensors to detect distance and location of obstacles. The device uses a servomechanism to steer the device away from the obstacle. The operator who is pushing the device, must also merely follow the device as objects are sensed and avoided. The operator has no idea of or any information about the object around which the Borenstein device has guided him.

The Eldridge Patent is a device using GPS to tell the location and direction of the operator and can be incorporated into a vehicle, to help the operator to go from one location to another. The device uses a display to convey its information, which can be in a Braille format, but beyond location and direction of the operator, the device conveys no information about the operator's surroundings.

The Schrader Patent is an orientation aid to help the visually impaired walk in a straight line or to return to a path after avoiding an obstacle. The device, incorporated into a belt worn by the operator, signals the operator, either on the left or the right side of the operator, to correspond to the direction the operator needs to move in order to return to the former path. This device merely advises the operator of the current compass direction in comparison to a former compass direction.

The Ellis Patent is a large system to encompass an entire city or larger to communicate and control the infrastructure, e.g. communicate traffic information to the main system and smaller systems, such as in a vehicle, and control the traffic lights to stop traffic and give emergency vehicles right of way. One part of this system is a device, to be used by pedestrians, housed in a cane, walking stick, or belt that receives signals by transmitters and receivers in the walking stick and communicates with the pedestrian operator. The device includes a processor, a transmitter receiver and an outside image sensor or scanner, and a warning device. The scanner may, for example, sense the shape of a traffic signal or color of a traffic signal and provide a signal back to the person. The device used by the pedestrian also transmits information, such as to automobiles who have receivers to communicate either visually, or aurally with the driver that a pedestrian is near by, and may initiate the braking system on the car so as not to hit the pedestrian. The walking stick for pedestrians in the Ellis Patent is merely a warning device and does not convey information about the physical characteristics of the pedestrian's surroundings.

The Sussman Patent discloses the concept of providing signals which are picked up from laser transmitted signals to advise the blind person about different areas around the person. The device merely communicates distance of a detected object and communicates this information by the use of either vibrations on the skin, an audio amplifier, or tightening bands around the fingers.

The Ritz Patent is a one point distance recognition system that conveys distance to the operator. Distance is communicated to the operator by a pin that slides horizontally along the side of the device. Distance is indicated by the distance the pin slides from the zero position to anywhere along a three centimeter track. The scale of distance of the three centimeter track can be changed by the operator The Beckers Patent has an invention which leads the operator from position to position. The system enables the operator to find his bearings in an unknown environment. Although this is a very involved technical patent with the various means to calculate distances and other information about the surroundings of the blind person, it is merely a position marker orientation system. The device does not provide any object recognition, nor does it communicate any information about the operator's surroundings.

The Fischer European Patent Application discloses a guidance device that is used for orienting a blind person within an environment, and includes a radar signal transmitter and a radar signal receiver. The device is incorporated into a helmet that transmits the signals which receives return information and requires a wire to connect the instruments in the helmet to the radar signal sender that resides in a belt worn around the waist. This invention teaches only an obstacle recognition device.

The Detlef European Patent Application discloses a guidance device used for a blind person is built in two parts. One part includes a receiver and a transmitter. The second part includes a microprocessor for processing the signals from the receiver. The second part of the guide also includes a mechanical signal generator, a current supply and a charger. The second part can be held in the blind person's breast pocket. The first part includes the current supply, batteries and charging circuit. The transmitter emits ultrasound waves which are reflected by an obstacle. The reflected signal warns the user about the presence of an obstacle.

Overall, the prior art teaches the broad concept of obstacle recognition and avoidance devices. However, these devices are unsatisfactory. The main reason is that these devices don't allow their operators to 'see' the objects detected. Generally, the blind and visually impaired must touch an object to 'see' it; in doing so, the blind can feel the shapes, contours, textures, and temperatures of the objects with their fingertips. While the prior art alerts the operator that an object is present and needs to be avoided, that is all the information conveyed to the operator. The devices can't convey to the operator that the object detected is a mailbox or child. These devices can't direct the blind to the green door as opposed to the red door, nor can it alert the blind that there is a fire behind the door they are approaching. These devices can only operate in the open air and cannot aid the visually impaired under water.

SUMMARY OF THE INVENTION

The present invention relates generally to the field of virtual tactile sensing, specifically to the field of virtual extension of the senses of the fingertips. Specifically, the present invention is the tactile transfer of environment information to the fingertips of the operator in the form of a line. The present invention senses information regarding distance, thermal values and optical spectrum values and conveys this information to the operator by means of mechanical movements and/or thermal changes of the actuators. These actuators are the equivalent of placing the operator's fingertips on the object. The device as a whole acts as an extension of the hand that senses information by placing virtual fingertips on an object and conveys that information to the operator's fingertips.

It is an object of the present invention to provide an environment sensor, preferably for the blind, that is a single, light weight unit.

It is also an object of the present invention to provide an environment sensor, preferably for the blind, that is safe, reliable and easy to use.

It is an additional object of the present invention to provide an environment sensor, preferably for the blind, that is wireless.

It is a further object of the present invention to provide an environment sensor, preferably for the blind, that is hand-held and capable of being used by only one hand.

It is still a further object of the present invention to provide a an environment sensor, preferably for the blind, that is capable of being used in any environment or location including, underground, subways, and tunnels.

It is still a further object of the present invention to provide a an environment sensor, preferably for the blind, that is capable of more than mere object detection and position guidance and can provide the equivalent of fingertip extension so as to convey the physical attributes of objects by virtual touch to the operator.

It is still a further object of the present invention to provide a an environment sensor, preferably for the blind, with all the above features that is waterproof and capable of detecting underwater and aiding the visually impaired underwater.

It is still a further object of the present invention to provide a an environment sensor, preferably for the blind, with all the above features that is affordable.

In general, it is an object of the present invention to provide an environment sensor to be used by blind people to enable them to determine information about objects in the vicinity of the blind person.

Further novel features and other objects of the present invention will become apparent from the following detailed description, discussion and the appended claims, taken in conjunction with the drawings.

In carrying out the above objects and other objects, and to overcome these limitations of the prior art, the present invention is a small, accurate, and very light-weight handheld device, that incorporates a unique combination, controlled by software and a micro-controller, of a sensing line of light and a series of actuators. This combination allows for real-time, synchronous scanning in two dimensions, for example length and depth, of an area, detection of objects, determination of objects' structure, appearance, texture and other properties, and conveyance of the structure, appearance, texture and other properties to the operator in such a manner that the blind or visually impaired operator, at the least, will have learned information about the objects as if the blind or visually impaired operator had touched the objects personally. The environment sensor is capable of detecting both moving and stationary objects, including the outlines of objects close up and far away. The environment sensor is highly sensitive and currently has an accuracy of 0.039 inches, mere millimeters. The present invention is capable of fine detection and can convey the texture of a footpath. The present invention is small, light-weight, unobtrusive, easy to use, unaffected by weather or temperatures, does not require maintenance, is silent, impact resistant, does not require any time to warm up, and is ready to use when switched on.

The present invention is a lightweight, inexpensive, handheld sensing device that enables the blind and visually impaired to do what sighted people take for granted: find their way around their surroundings. The preferred embodiment of the present invention weighs 4.2 ounces. Many types of batteries can enable the operation of the sensing device, but the preferred embodiment utilizes a lithium ion battery within the body of the sensor. On the principle of replacing the sense of sight with that of touch, the environment sensor uses sensors to detect objects and open spaces located at distances between twenty centimeters and three meters of the operator. The environment sensor then transmits information to the operator about the position, location, contours, temperature, color and even magnetic fields of the objects around the operator. The unique features of the device allow the operator to 'feel' the surroundings without the need to physically touch them. The environment sensor is a handheld device that uses a 3D sensor to create a line of light approximately two meters long, at an angle of 5 degrees to 45 degrees from horizontal, which equates to a total of 10 degrees to 90 degrees and which can scan up to 65 feet, depending on the sensors used and if the zoom feature is used. Because this line of light is in a handheld device, the operator can move the device, and hence, the line of light, around his person at will. When the line of light meets with an object, the distance is synchronously transmitted to several touch pins located in the handle of the device, in a location over which the hand and fingers naturally reside to grip and operate the device. When these touch pins are not activated, the touch pins reside within the handle and are not felt by the operator. When the touch pins are activated, the touch pins extend out of the handle at varying lengths in accordance with the information detected. For example, if the device and its line of light were scanning across the bottom of a bowl, the device would scan a line of light across the diameter, chord, secant or tangent of the bowl. Those pins associated with the portion of the line of light that detected the rim of the bowl would protrude the farthest, and those pins associated with the scanning of the center of the bottom of bowl would protrude less than those pins detecting the rim of the bowl with the shortest protrusion or no protrusion representing the bottom of the bowl, followed by pins gradually increasing in protruding length until the longest protrusion again represents the rim of the bowl on the other side. In this manner, the operator can detect the structure, appearance, and texture of the object and develop a mental image of its shape and distance. The angle and direction in which the environment sensor is moved around the surroundings and the operator will provide information about the position relative to the operator, distance from the operator and contours of the objects detected. Consequently, the operator receives comprehensive information about the space surrounding him in a radius of twenty centimeters to three meters.

The present invention is also capable of detecting and conveying information regarding temperature, brightness, color, and magnetic fields. Utilizing a camera or other spectral sensor, the environment sensor displaces the pins in the same manner described above to convey relative temperature, brightness, color, and magnetic fields strength to the operator. In conveying temperature, the pins in the palpation line will extend farther to express hot temperatures and less to convey cooler temperatures. In conveying levels of brightness, the pins will be displaced more to convey light and less to convey darkness. The pins can also express different colors of the rainbow: red, orange, yellow, green, blue, indigo, and violet. The pins will be displaced less for colors at the low end of the visible light spectrum and will be displaced more for colors at the high end of the visible light spectrum, all according to criteria and programming in the microcontroller.

The present invention has many applications and is not limited to the visually impaired. By way of example, the device can enable the police to stand along a shore or a bridge and scan the water for objects. The device can enable the military to scan items that are otherwise camouflaged. The device can enable children at the zoo to safely "feel" the lion.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Figure 1:
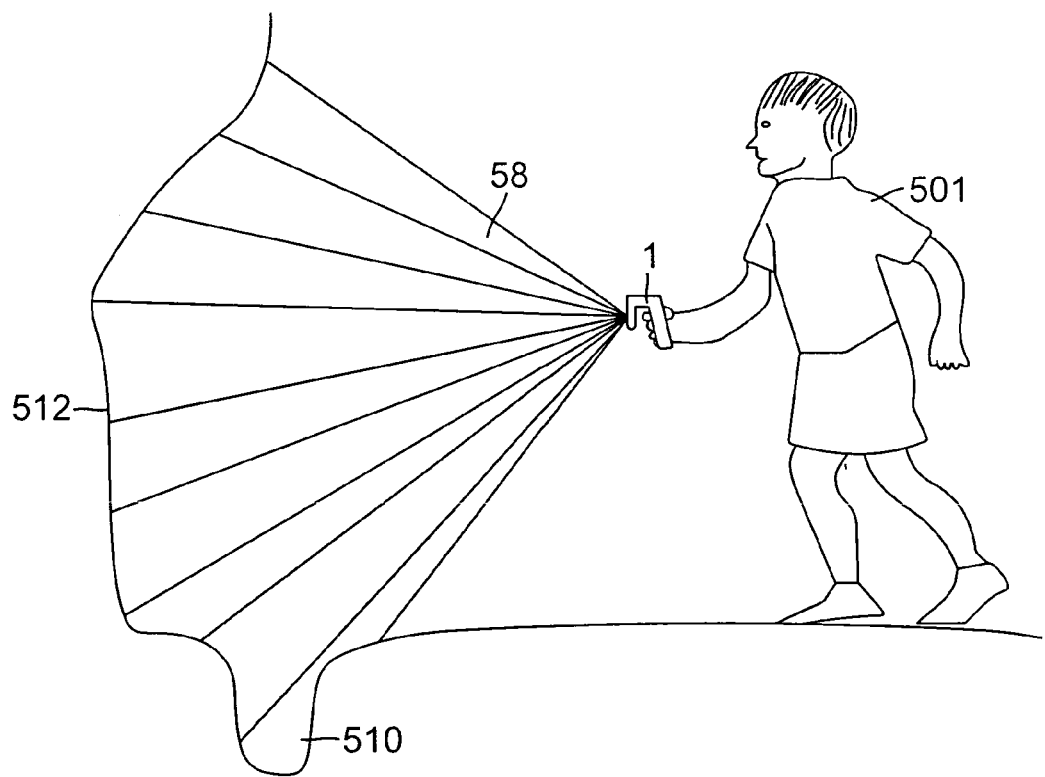
FIG. 1 is a panoramic view of a preferred embodiment of the environment scanner being used by an operator and in its operational mode, scanning the environment.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIGS. 1, 3, 4, and 8, the present invention is an environment sensor 1 that creates a scanning fan of light and conveys the information about the environment to the operator 501 tactily by means of a line of small thin rods or pins 74 arranged in a line in the handle 12 of the environment sensor 1 and aligned so as to lie under the fingertips of the operator 501. The environment sensor 1 is designed to be light weight and the preferred embodiment of the present invention weighs 4.2 ounces. The body 10 can be made by various methods and in various configurations, which are within the contemplation of this invention. By way of example, the present invention is preferably made by the injection mold method. The present invention includes a sensor, which includes a receiver (photodiodes 64), a data processing unit and an output unit 70. The information received from the environment includes the physical attributes of an object and are generally the distance from the operator 501, however the operator 501 may switch modes and determine other attributes of scanned objects such as temperature, hot/cold, shading, brightness, dark/light, color and magnetic field strength. All this information is conveyed to the operator's fingertips by means of the pins 74 along the palpation line 72.

The present invention is a single, all-inclusive, small, handheld, portable device. The scanner, in distance detection mode, senses and conveys not just the distance of an object but also the finer physical qualities of the object, such as the shape of the object, whether the texture of the object is rough or smooth, such that, even though the operator 501 is standing at a distance from the object, the operator 501 senses the object as if the operator 501 was physically touching the object. Not only can the operator 501 orient himself in his surroundings, but the operator 501 can differentiate between the features of the various objects.

This procedure permits the acquisition of information over different types of collection units and methods, as for example, sensors, cameras, or artificially produced data. The data captured, either digital or analog, is filtered and processed by means of integrated software or other procedures. The processed data is then transferred to the user by means of an output unit 70 preferably in the form of a palpation line 72 which is comprised of a line pins 74. In the present embodiment, the pins 74 have a maximum extension range of 0.118 inches. Like scanning with the fingers, the operator 501 can 'feel' the environment from a distance and can orient himself therein, as well as distinguish among objects. Although only a single line of touch is conveyed to the user at any one time, sweeping the device, up and down and side to side, will give the operator 501 a complete picture of the environment. By means of this virtual extension of the sensory organ, the operator 501 can thus 'touch' and 'feel' a perceptible graphic representation of the surrounding environment.

Referring to FIG. 1, there is shown the operator 501 using the environment sensor 1 and approaching a hole 510 in the ground and a vaulted wall 512. The environment sensor 1 is held by the operator 501 in only one hand and is in operation mode. The environment sensor 1 sends a vertical line of light fanning before the sensor, (hereafter 'light fan 58'). The light fan 58 is created by the sensor 50. Objects reflect the light on the receiving sensors and by highly accurate light run time measurement, distances, and, particularly, subtle distances, are captured. The environment sensor, through its unique sensor 50 and output mechanisms, captures objects, obstacles, holes 510 and spaces between objects.

Within the housing body 10 of the environment sensor 1 are three primary units: a 3-D Line Sensor, a microcontroller 30, and a palpation output. The 3-D Line Sensor 50 sends forward a light fan 58. The light fan 58 scan 5 degrees to 45 degrees, adjustable with a zoom feature. The frequency of the light fan 58 is 700 nm to 20 MHz. The 3-D Line Sensor 50 then performs scans of the area covered by the light fan 58 at a high scan rate, then measures the reflected and received signals of the light fan 58. The preferred method to determine distance is light-time measurement or time-of-flight (TOF) measurement. The TOF may be used in one of several procedures, such as a triangulation, stereo-triangulation, interferometrics, or other opto-electronic procedures, to measure the distance. The processed distances data are then converted by an opto-electrical transducer 68 then transferred to a computer unit, preferably a microcontroller 30. These data are then prepared. Errors are corrected by integrated, intelligent software. The software processes the data, which was generated at each sensor, with a high scanning rate, e.g. 1000 pictures/second. The data set from each sensor 50 is analyzed, verified, and corrected of errors by specific formulas programmed into the software, and stored. The value of the distance from the point of measurement is taken again and determined by the running time of the pulsed or periodically modulated optical signal. This value is then compared with the previous, stored data, examined again for error plausibility. If the values are 'clean' of errors, the error correction is effectively turned off and the data will be conveyed to the operator 501. With the continuous collection of data the software computes, for example, by comparison of sequential measurements speeds and directions of moving objects.

To produce a perceptible representation for the operator 501, the 'clean' data are converted into tactile perceptible signals by an electrotechnical transducer, which is preferably an engine, to a palpation line. The determined distances are then conveyed to the operator 501 along the palpation line. The palpation line 72 translates the measured values as output unit 70 into a format easily understandable by the operator 501. A unique feature of the environment sensor 1 is that determinations of distances can also be made in a water environment, both from outside the water environment measuring into the water and from inside the water environment sensing the water environment. Thus, a visually impaired person may enjoy snorkeling, scuba diving, viewing through a glass bottom boat, and the like.

The unique feature of the palpation line 72 is that the captured data is expressed as a real-time, flowing line. The measured distance is transformed into a tactile distance, by displacement of the pin 74 from its resting position within the handle 12 of the device to a maximum of 0.118 inches. Measurements and distances are represented by varying the displacement of the pins 74. The pins 74 are driven out from resting position more if the object is far away than if the object is nearby. While other embodiments may have numerous pins 74, the present invention utilizes a total of eight pins 74, thus each pin 74 represents ⅛ of that which is scanned. Other embodiments of the environment sensor 1 may have different extension ranges for the pins 74, but the present embodiment has a maximum extension range of 0.118 inches.

Figure 2:
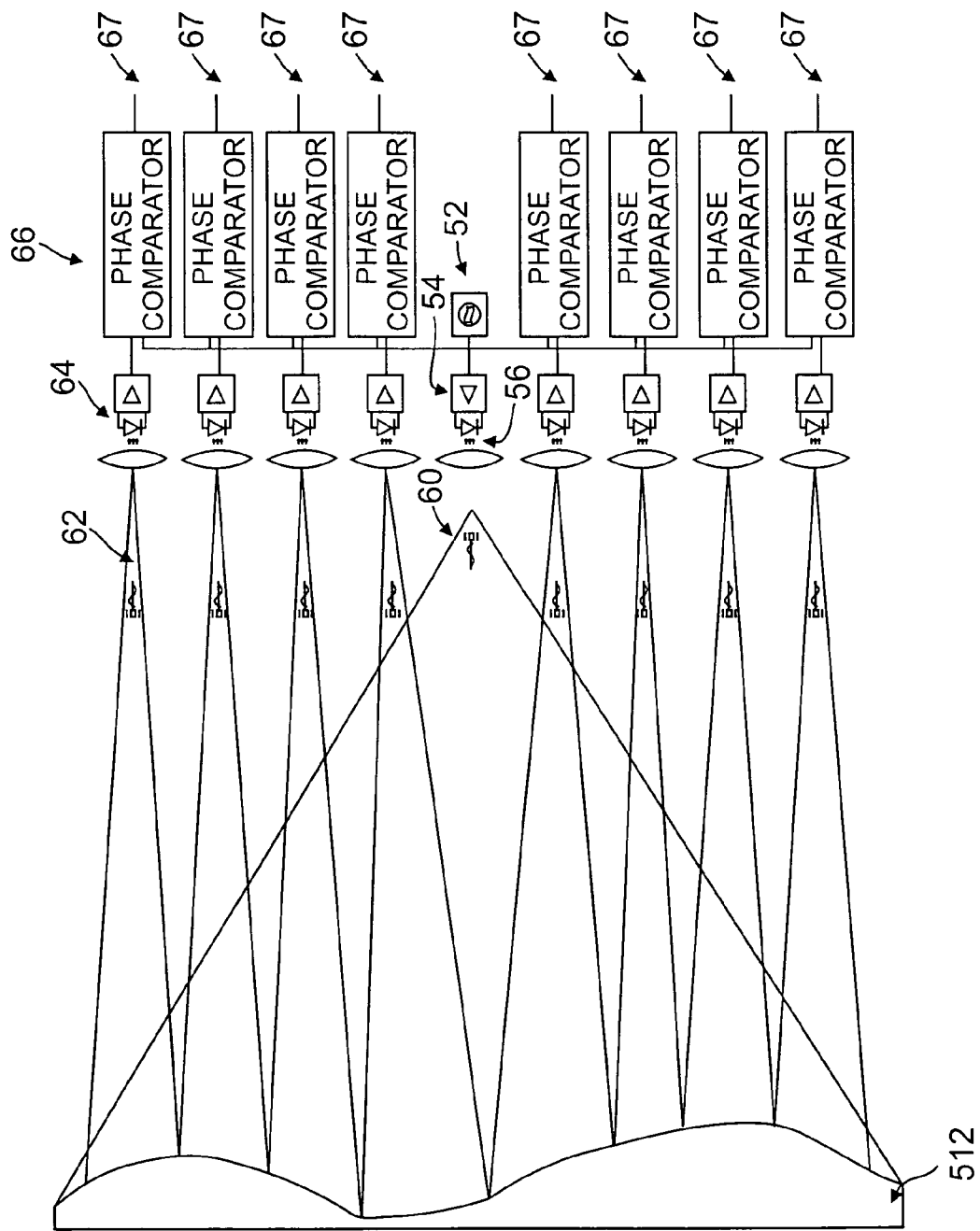
FIG. 2 is a detail schematic of a preferred embodiment of the scanning sensor in operational mode, its electronics, its light fan and the reflected light.

Referring to FIG. 2, there is shown a detail schematic of the scanning sensor 50 in operating mode. An oscillator 52 generates a swinging frequency that is transferred to each amplifier 54 and the corresponding LED 56. The LED 56 produces a light fan 58, using cylinder optics, which is modulated by the oscillator 52. The modulated light 60 is then reflected by an object. The reflected light 62 meets a photo diode 64, which strengthens the signal and transfers the signal to a phase comparator 66. The rate of scanning is a minimum of 100 frames per second. The phase comparator 66 compares the frequency of the oscillator 52 with the received frequency and continues to give the phase shift, which is between 0° and 90°, as an analog signal 67 to the analog/digital transducer 68. The value of the phase shift is measured, which represents the distance to the object.

Figure 3:
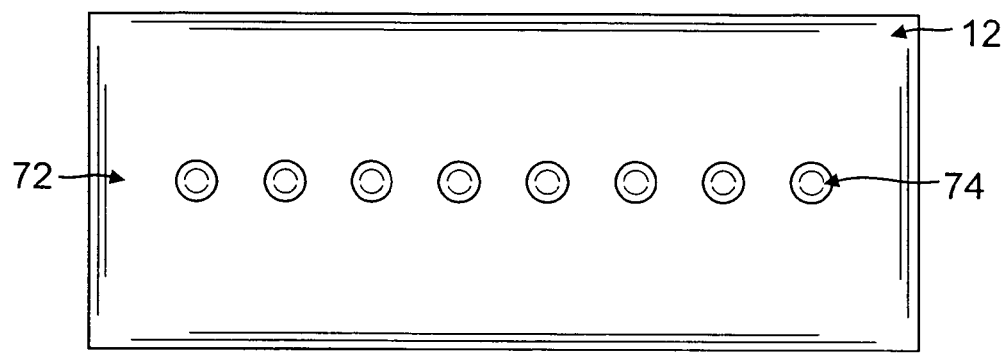
FIG. 3 is a close-up view of a preferred embodiment of the environment scanner showing a detail of the pin area.

Referring to FIG. 3, there is shown a detail of a palpation line. The palpation line 72 consists of a row or column, depending on the orientation, of pins 74 which are integrated in the handle 12 of the device and aligned such that the palpation line 72 resides under the natural line of the fingertips when the handle 12 is held. The zero position of the pins 74 is such that the entirety of the pin 74 lies within the handle 12 or in a position that is neutral with respect to the operator 501's fingertips. A preferred embodiment has a palpation line 72 of eight pins 74, two for each finger. There is no corresponding pin 74 for the thumb, which resides on the top 13 of the handle 12.

Figure 4:
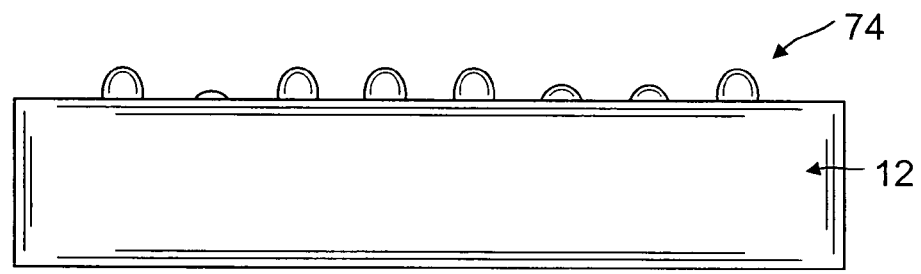
FIG. 4 is a close-up view of a side elevation of a preferred embodiment of the environment scanner detailing the pin area in a moment of use.

Referring to FIG. 4, there is shown a detail side elevation of the palpation line 72 in operation mode. The palpation line 72 is in motion displaying the various subtle distances across an object that is sensed. The pins in the palpation line 72 are moved by actuators 76 outward of the handle 12 several millimeters in accordance with the relative distances sensed. The pins 74 transfer the distance data with a high pulse rate. The translation of the pins 74 is that the nearer an object, the further the pins 74 are displaced outwardly.

Figure 5:
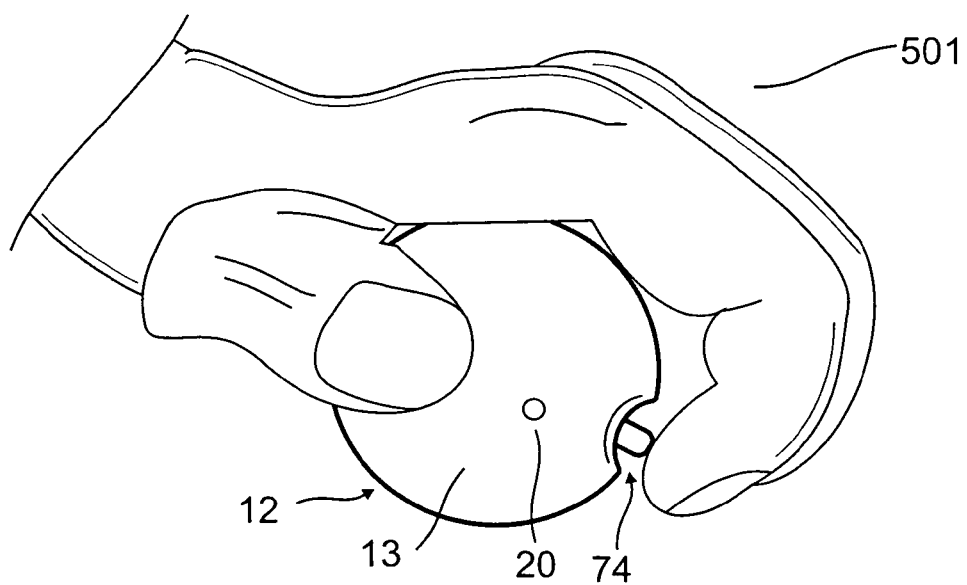
FIG. 5 is a close-up top view of a preferred embodiment of the environment scanner showing a detail of the positioning of the pins and the grip in relation to the hand of the operator.

Referring to FIG. 5, there is shown a detail top view of the handle 12 being held by the operator 501. The operator 501, when holding the handle, finds that fingertips rest over the top of the palpation line 72 and touch the pins 74 when the pins 74 are actuated. The on/off switch 20 resides on the top surface 13 of the handle 12.

Figure 6:
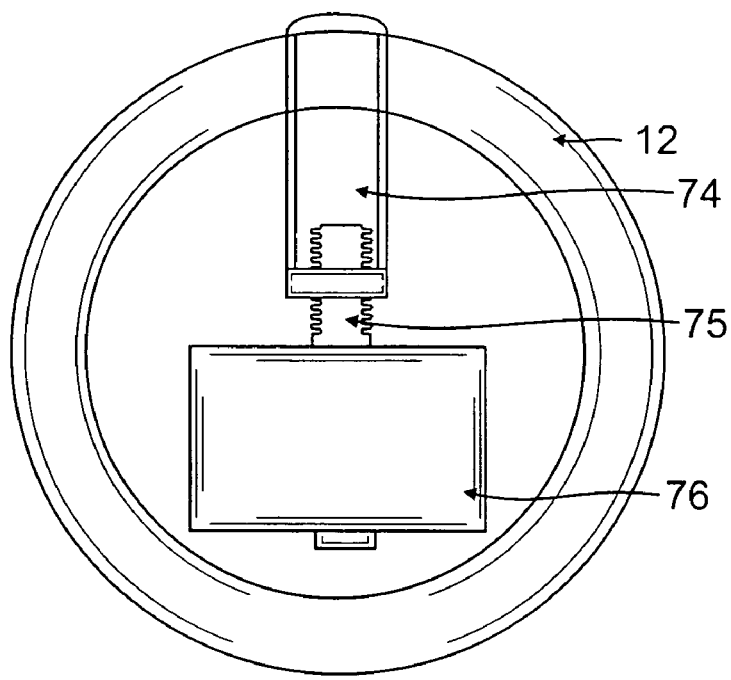
FIG. 6 is a close-up cross-sectional view of the pin area in the handle of a preferred embodiment of the environment scanner detailing a single, representative pin and its corresponding mechanism.

Referring to FIG. 6, there is shown a detail cross-sectional view of a preferred embodiment of the actuator 76 mechanism. There are several procedures suitable to produce a perceptible displacement of the pins 74, such as magnetic, electronic or electrical procedures, the preferred method is mechanical. The stroke of the pin is released by the turn of the spindle 75. A single spindle 75 moves in proportion to the other spindles 75 in accordance with the scale of the current detection mode and in relation to the values of the data received and cleaned.

Figure 7:
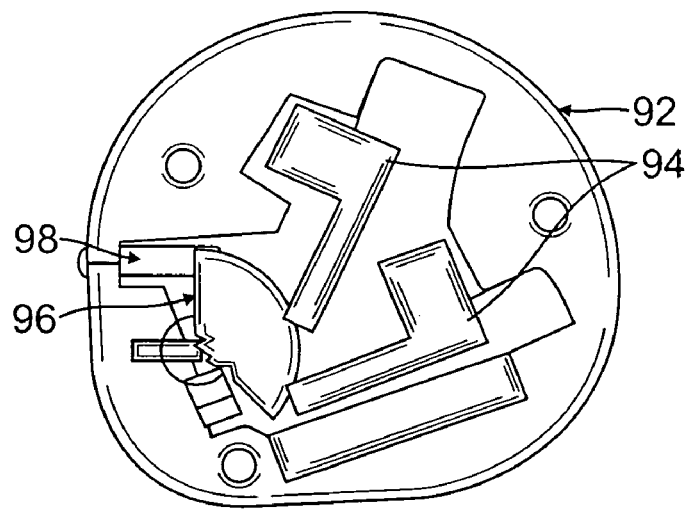
FIG. 7 is a close-up cross-sectional view of an alternate embodiment of the pin area in the handle of the environment scanner detailing a single, representative pin and its corresponding mechanism.
Figure 8:
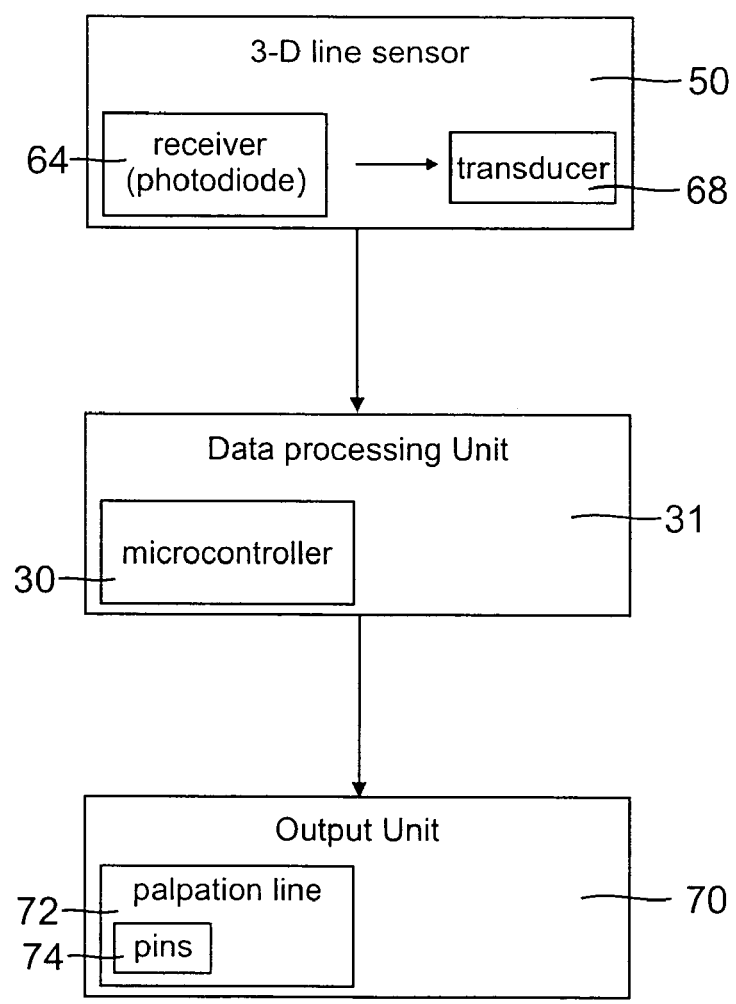
FIG. 8 is a block diagram of the primary functions of the systems within the preferred embodiment.

In referring to FIG. 7, there is shown a close-up cross-sectional detail of an alternate embodiment which is using a piezo drive 94. The piezo drive 94 moves an impeller 96. This impeller 96 strokes the pin 98 in and out to the proper distance as determined above.

Defined in detail, the present invention is an environment sensing device for a visually impaired user capable of real-time tactile transference of environmental information to a user to simulate touching an object with the fingertips, comprising: (a) a housing member having at least a handle and retaining all components of the sensing device; (b) an electro-opto modulator system that generates a line of modulated light such that the light has a phase shift from 0° to 90°, the reflection of the modulated light from an object is received by the sensing device and the distance of the object from the sensing device is determined; (c) a phase comparator system having at least eight phase comparators, that determine the difference in phase between the sent light and the received light; (d) a 3-D line sensor system having at least eight photodiodes, one each to correspond with a phase comparator, that detects, receives, and transmits signals regarding reflected light; (e) a single light source directed orthogonally from the sensor system and controlled, in part, by means of the electro-opto modulator system; (f) a processing and control system that determines the distance of the reflected light from an object and controls the electro-opto modulator system, the phase comparator system, and an output system; (g) a method to correct for errors and clean the data; (h) an output system having at least one column of tactile elements displaceable continuously along a path perpendicular to the handle of the housing as a two dimensional representation of the distances measured by the distance measuring system, which are displaced by mechanical actuators, the displacement conveying to the user the physical shape, contours and texture of the scanned object; and (i) a wireless, lightweight, power supply system located in the housing member, which powers the sensing device.

Described more broadly, the present invention is an environment sensing device for a visually impaired user capable of real-time tactile transference of environmental information to a user to simulate touching an object with the fingertips, comprising: (a) a housing member having at least a handle and retaining all components of the sensing device; (b) an electro-opto modulator system that generates a line of modulated light such that the light has a phase shift and the reflection of the modulated light from an object is received by the sensing device and from which the distance of the object from the sensing device is determined; (c) a phase comparator system having a multiplicity of phase comparators, that determine the difference in phase between the sent light and the received light; (d) a 3-D line sensor system having a multiplicity of light receiving elements, one each to correspond with a phase comparator, that detects, receives, and transmits signals regarding reflected light; (e) a single light source directed orthogonally from the sensor system and controlled, in part, by means of the electro-opto modulator system; (f) a processing and control system that determines the distance of the reflected light from an object and controls the electro-opto modulator system, the phase comparator system, and an output system; (g) a method to correct for errors and clean the data; (h) an output system having at least one column of tactile elements displaceable continuously along a path perpendicular to the handle of the housing body as a two dimensional representation of the distances measured by the distance measuring system, the displacement conveying to the user the physical shape, contours and texture of the scanned object; and (i) a wireless, lightweight, power supply system located in the housing member, which powers the sensing device.

Described even more broadly, the present invention is an environment sensing device for a visually impaired user capable of real-time tactile transference of environmental information to a user to simulate touching an object with the fingertips, comprising: (a) a housing member having at least a handle and retaining all components of the sensing device; (b) an electro-opto modulator system that generates a line of modulated light, the reflection of the modulated light from an object is received and from which distance is determined; (c) a phase comparator system that determines the difference in phase between the sent light and the received light; (d) a 3-D line sensor system that detects, receives, and transmits signals regarding reflected light; (e) a single light source directed orthogonally from the sensor system and controlled, in part, by means of the electro-opto modulator system; (f) a processing and control system that determines the distance of the reflected light from an object and controls the electro-opto modulator system, the phase comparator system, and an output system; (g) a method to correct for errors and clean the data; (h) an output system having at least one column of tactile elements displaceable continuously along a path perpendicular to the handle of the housing as a two dimensional representation of the distances measured by the distance measuring system, which are displaced by mechanical actuators, the displacement conveying to the user the physical shape, contours and texture of the scanned object; and (i) a wireless, lightweight, power supply system located in the housing member, which powers the sensing device.

Also described broadly, the present invention is an environment sensing device capable of real-time tactile transference of environmental information to fingertips of a user, comprising: (a) a housing member having at least a handle and retaining all components of the sensing device; (b) an electro-opto modulator system that generates a line of modulated light, the reflection of the modulated light from an object is received by a sensor and from which the distance of the object is determined; (c) a phase comparator system that determines the difference in phase between the sent light and the received light; (d) a 3-D line sensor system that detects, receives, and transmits signals regarding reflected light; (e) a processing and control system that determines the distance of the reflected light and controls the electro-opto modulator system, the phase comparator system, and an output system; (f) a method to correct for errors and clean the data; (f) an output system having at least one column of tactile elements displaceable continuously along a path perpendicular to the handle of the housing as a two dimensional representation of the distances measured by the distance measuring system; and (g) a wireless, lightweight, power supply system located in the housing member, which powers the sensing device.

Described most broadly, the present invention is an environment sensing device capable of real-time tactile transference of environmental information to the fingertips, comprising: (a) a housing body member having at least a handle and containing components of the sensing device; (b) a 3-D line sensor system comprising a distance measuring system, which generates a modulated line of light, the reflection of which is received and from which distance is determined, which also generates a method to correct for errors and clean the data; and (c) an output system having at least one column of tactile elements displaceable continuously along a path perpendicular to the handle of the housing body as a two dimensional representation of the distances measured by the distance measuring system.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An environment sensing device for a visually impaired user capable of real-time tactile transference of environmental information to a user to simulate touching an object with the fingertips, the environment sensing device comprising:
   a. a single housing member having at least a handle and retaining all components of the environment sensing device;
   b. an electro-opto modulator that generates a line of modulated light such that the light has a phase shift from 0° to 90°, the reflection of the modulated light from a scanned object is received by the environment sensing device and a distance of the object from the environment sensing device is determined;
   c. a phase comparator having at least eight phase comparators, that determine a difference in phase between the light sent by the electro-opto modulator and light received by the environment sensing device;
   d. a 3-D line sensor having at least eight photo-diodes, one each to correspond with a phase comparator, that detects, receives, and transmits signals regarding reflected light;
   e. a single light source directed orthogonally from the environment sensing device and controlled, in part, by said electro-opto modulator;
   f. a processing and control apparatus that determines the distance of the reflected light from an object and controls said electro-opto modulator system, said phase comparator, and an output apparatus;
   g. the output apparatus having at least one column of tactile elements displaceable continuously along a path perpendicular to the handle of the housing as a two dimensional representation of the distances measured by said environment sensing device, which are displaced by mechanical actuators, said displacement conveying to the user the physical shape, contours and texture of the scanned object; and
   h. a wireless, lightweight, power supply located in said housing member, which powers the environment and sensing device.

2. The environment sensing device in accordance with claim 1, wherein said output apparatus includes a piezo drive actuator.

3. The environment sensing device in accordance with claim 1, wherein said 3-D line sensor includes a temperature sensing apparatus.

4. The environment sensing device in accordance with claim 1, wherein said 3-D line sensor includes a color sensing apparatus.

5. The environment sensing device in accordance with claim 1, wherein said 3-D line sensor includes a magnetic field sensing apparatus.

6. The environment sensing device in accordance with claim 1, wherein said 3-D line sensor is waterproof.

7. The environment sensing device in accordance with claim 1, wherein said 3-D line sensor can operate effectively in a water medium.

8. An environment sensing device for a visually impaired user capable of real-time tactile transference of environmental information to a user to simulate touching an object with the fingertips, the environment sensing device comprising:
   a. a single housing member having at least a handle and retaining all components of the sensing device;
   b. an electro-opto modulator that generates a line of modulated light such that the light has a phase shift and reflection of the modulated light from a scanned object is received by the environment sensing device and from which the distance of the scanned object from the environment sensing device is determined;
   c. a phase comparator having at least eight phase comparators, that determine a difference in phase between the light sent by the electro-opto modulator and light received by the environment sensing device;
   d. 3-D line sensor having at least eight photo-diodes, one each to correspond with a phase comparator, that detects, receives, and transmits signals regarding reflected light;
   e. a single light source directed orthogonally from the environment sensing device and controlled, in part, by said electro-opto modulator;
   f. a processing and control apparatus that determines the distance of the light from reflected the scanned object and controls said electro-opto modulator, said phase comparator, and an output apparatus;
   g. the output apparatus having at least one column of tactile elements displaceable continuously along a path perpendicular to the handle of the housing body as a two dimensional representation of the distances measured by said environment sensing device, said displacement of said tractile elements conveying to the user the physical shape, contours and texture of the scanned object; and
   h. a wireless, lightweight, power supply located in said housing member which powers the environment sensing device.

9. The environment sensing device in accordance with claim 8, wherein said output apparatus includes a piezo drive actuator.

10. The environment sensing device in accordance with claim 8, wherein said 3-D line sensor includes a temperature sensing apparatus.

11. The environment sensing device in accordance with claim 8, wherein said 3-D line sensor includes a color sensing apparatus.

12. The environment sensing device in accordance with claim 8, wherein said 3-D line sensor includes a magnetic field sensing apparatus.

13. The environment sensing device in accordance with claim 8, wherein said 3-D line sensor is waterproof.

14. The environment sensing device in accordance with claim 8, wherein said 3-D line sensor can operate effectively in a water medium.

15. An environment sensing device for a visually impaired user capable of real-time tactile transference of environmental information to a user to simulate touching an object with the fingertips, the environment sensing device comprising:
   a. a single housing member having at least a handle and retaining all components of the sensing device;
   b. an electro-opto modulator that generates a line of modulated light, such that reflection of the modulated light from a scanned object is received by the environment sensing device and from which distance between the scanned object and the environment sensing device is determined;
   c. a phase comparator having at least eight phase comparators, that determine a difference in phase between the light sent by the electro-opto modulator and light received by the environment sensing device;
   d. 3-D line sensor having at least eight photo-diodes, one each to correspond with a phase comparator, that detects, receives, and transmits signals regarding reflected light;
   e. a single light source directed orthogonally from the 3-D line sensor and controlled, in part, by said electro-opto modulator;
   f. a processing and control apparatus that determines the distance of the reflected light from a scanned object and controls said electro-opto modulator, said phase comparator, and an output system apparatus;
   g. the output apparatus having at least one column of tactile elements displaceable continuously along a path perpendicular to the handle of the housing as a two dimensional representation of the distances measured by said environment sensing device, which are displaced by mechanical actuators, said displacement conveying to the user the physical shape, contours and texture of the scanned object; and
   h. a wireless, lightweight, power supply located in said housing member, which powers the environment sensing device.

16. The environment sensing device in accordance with claim 15, wherein said output apparatus includes a piezo drive actuator.

17. The environment sensing device in accordance with claim 15, wherein said 3-D line sensor includes a temperature sensing apparatus.

18. The environment sensing device in accordance with claim 15, wherein said 3-D line sensor includes a color sensing apparatus.

19. The environment sensing device in accordance with claim 15, wherein said 3-D line sensor includes a magnetic field sensing apparatus.

20. The environment sensing device in accordance with claim 15, wherein said 3-D line sensor is waterproof.

21. The environment sensing device in accordance with claim 15, wherein said 3-D line sensor can operate effectively in a water medium.

22. An environment sensing device capable of real-time tactile transference of environmental information to fingertips of a user, the environment sensing device comprising:
   a. a single housing member having at least a handle and retaining all components of the sensing device;
   b. an electro-opto modulator that generates a line of modulated light, such that reflection of the modulated light from a scanned object is received by the environment sensing device and from which distance between the scanned object and the environment sensing device is determined;
   c. a phase comparator having at least eight phase comparators, that determine a difference in phase between the light sent by the electro-opto modulator and light received by the environment sensing device;
   d. 3-D line sensor having at least eight photo-diodes, one each to correspond with a phase comparator, that detects, receives, and transmits signals regarding reflected light;

e. a processing and control apparatus that determines the distance of the reflected light from a scanned object and controls said electro-opto modulator, said phase comparator, and an output apparatus;

f. the output apparatus having at least one column of tactile elements displaceable continuously along a path perpendicular to the handle of the housing as a two dimensional representation of the distances measured by said environment sensing device, which are displaced by mechanical actuators, said displacement conveying to the user the physical shape, contours and texture of the scanned object; and g. a wireless, lightweight, power supply system located in said housing member, which powers the environment sensing device.

23. The environment sensing device in accordance with claim 22, wherein a sweeping motion of the device causes the displacement of the pins in the output apparatus to convey to the user the shape, contours and texture of the object scanned.

24. The environment sensing device in accordance with claim 22, wherein said output apparatus includes a piezo drive actuator.

25. The environment sensing device in accordance with claim 22, wherein said 3-D line sensor includes a temperature sensing apparatus.

26. The environment sensing device in accordance with claim 22, wherein said 3-D line sensor includes a color sensing apparatus.

27. The environment sensing device in accordance with claim 22, wherein said 3-D line sensor includes a magnetic field sensing apparatus.

28. The environment sensing device in accordance with claim 22, wherein said 3-D line sensor is waterproof.

29. The environment sensing device in accordance with claim 22, wherein said 3-D line sensor can operate effectively in a water medium.

30. An environment sensing device capable of real-time tactile transference of environmental information to the fingertips, the environment sensing device comprising:

a. a single housing body member having at least a handle and containing all the components of the sensing device;

b. a phase comparator having at least eight phase comparators, that determine a difference in phase between the light sent by an electro-opto modulator and light received by the environment sensing device;

d. a 3-D line sensor comprising a distance measuring apparatus, which generates a modulated line of light, the reflection of the modulated line of light is received by the environment sensing device and from which distance between an object and the environment sensing device is determined, wherein the 3-D line sensor having at least eight photo-diodes, one each to correspond with a phase comparator, that detects, receives, and transmits signals regarding reflected light; and d. an output apparatus having at least one column of tactile elements displaceable continuously along a path perpendicular to the handle of the housing body as a two dimensional representation of the distances measured by said environment sensing device.

31. The environment sensing device in accordance with claim 30, wherein a sweeping motion of the environment sensing device causes the displacement of the pins in the output apparatus to convey to the user the shape, contours and texture of the object scanned.

32. The environment sensing device in accordance with claim 30, wherein said output apparatus includes a piezo drive actuator.

33. The environment sensing device in accordance with claim 30, wherein said 3-D line sensor includes a temperature sensing apparatus.

34. The environment sensing device in accordance with claim 30, wherein said 3-D line sensor includes a color sensing apparatus.

35. The environment sensing device in accordance with claim 30, wherein said 3-D line sensor includes a magnetic field sensing apparatus.

36. The environment sensing device in accordance with claim 30, wherein said 3-D line sensor and said output apparatus are powered by a wireless, lightweight, power supply capable of powering the device as a whole and capable of being fully located in said housing body member.

37. The environment sensing device in accordance with claim 30, wherein said 3-D line sensor is waterproof.

38. The environment sensing device in accordance with claim 30, wherein said 3-D line sensor can operate effectively in a water medium.

\* \* \* \* \*